US012014565B2

(12) United States Patent
Bae et al.

(10) Patent No.: US 12,014,565 B2
(45) Date of Patent: Jun. 18, 2024

(54) DISPLAY DEVICE INCLUDING DETECTION SENSOR AND METHOD OF MANUFACTURING THE DETECTION SENSOR

(71) Applicant: Samsung Display Co., Ltd., Yongin-Si (KR)

(72) Inventors: Joon-Hwa Bae, Suwon-si (KR); Bonggu Kang, Seoul (KR); Seungbae Kang, Suwon-si (KR); Heesung Yang, Hwaseong-si (KR); Woojin Cho, Yongin-si (KR); Byoung Kwon Choo, Hwaseong-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 93 days.

(21) Appl. No.: 17/538,901

(22) Filed: Nov. 30, 2021

(65) Prior Publication Data

US 2022/0188536 A1 Jun. 16, 2022

(30) Foreign Application Priority Data

Dec. 11, 2020 (KR) ........................ 10-2020-0173400

(51) Int. Cl.
*G06V 40/13* (2022.01)
*G06F 1/16* (2006.01)
(Continued)

(52) U.S. Cl.
CPC ............ *G06V 40/13* (2022.01); *G06F 1/1626* (2013.01); *G06F 3/0412* (2013.01); *G06F 21/32* (2013.01);
(Continued)

(58) Field of Classification Search
CPC .. G06V 40/13; G06V 40/1318; G06F 1/1626; G06F 3/0412; G06F 21/32;
(Continued)

(56) References Cited

U.S. PATENT DOCUMENTS 6,325,706 B1 * 12/2001 Krusell ............... H01L 21/3212
451/299
10,618,141 B2    4/2020 Chockalingam et al.
(Continued)

FOREIGN PATENT DOCUMENTS

| CN | 111668321 A | * | 9/2020 | ........... G06K 9/0002 |
| JP | 2017066386 A | * | 4/2017 | ............... B24B 1/00 |

(Continued)

OTHER PUBLICATIONS

JP-2017066386-A, machine translation, originally published 2017, p. 1-15 (Year: 2017).*

(Continued)

*Primary Examiner* — Katherine A Bareford
*Assistant Examiner* — Christina D McClure
(74) *Attorney, Agent, or Firm* — Innovation Counsel LLP

(57) ABSTRACT

A method of manufacturing a detection sensor is disclosed. The method includes forming a biometric information sensing layer including a transistor on a base layer, forming an initial optical pattern layer on the biometric information sensing layer, patterning the initial optical pattern layer to form a plurality of transmissive portions spaced apart from each other and having a first zeta potential, coating a light blocking material to form an initial light blocking portion that covers a side surface and an upper surface of the transmissive portions and has a second zeta potential different from the first zeta potential, and polishing the initial light blocking portion such that the upper surface of the transmissive portions is exposed to form a light blocking (Continued)

portion. The initial light blocking portion is polished by the abrasive, which has the first zeta potential, using a pad.

12 Claims, 14 Drawing Sheets

(51) Int. Cl.
    *G06F 3/041*     (2006.01)
    *G06F 21/32*     (2013.01)
    *H01L 27/146*     (2006.01)

(52) U.S. Cl.
    CPC .... *G06V 40/1318* (2022.01); *H01L 27/14683* (2013.01); *H01L 27/14685* (2013.01)

(58) Field of Classification Search
    CPC ......... H01L 27/14683; H01L 27/14623; H01L 27/14678; H01L 27/14685; H01L 27/14603; H10K 59/12; H10K 59/40; H10K 59/65; C09G 1/02; C09K 3/1454
    See application file for complete search history.

(56) References Cited

U.S. PATENT DOCUMENTS

| | | |
|---|---|---|
| 10,851,246 B2 | 12/2020 | Watanabe et al. |
| 2007/0243710 A1 | 10/2007 | Yi et al. |
| 2009/0047786 A1* | 2/2009 | Fukasawa ............ C09K 3/1409 |
| | | 438/693 |
| 2015/0352686 A1* | 12/2015 | Wu ........................ B24B 37/105 |
| | | 438/693 |
| 2016/0107286 A1 | 4/2016 | Sakashta et al. |
| 2016/0254312 A1 | 9/2016 | Lee et al. |
| 2018/0130672 A1* | 5/2018 | Kim ................. H01L 21/32125 |
| 2019/0051711 A1* | 2/2019 | Lee ........................ G06F 3/0446 |
| 2019/0054590 A1 | 2/2019 | Huang et al. |
| 2022/0058365 A1 | 2/2022 | Tomioka et al. |

FOREIGN PATENT DOCUMENTS

| | | | |
|---|---|---|---|
| KR | 10-0832993 B1 | 5/2008 | |
| KR | 10-1411019 B1 | 6/2014 | |
| KR | 10-1524626 B1 | 6/2015 | |
| KR | 10-2016-0002729 A | 1/2016 | |
| KR | 10-2018-0063363 A | 6/2018 | |
| KR | 10-2020-0074853 A | 6/2020 | |
| KR | 10-2020-0074927 A | 6/2020 | |
| WO | WO-2019177513 A1 * | 9/2019 | ............. G02B 27/30 |
| WO | 2020226005 A1 | 11/2020 | |

OTHER PUBLICATIONS

CN-111668321-A, machine translation, originally published 2020, p. 1-9 (Year: 2020).*

Tomioka, WO 2020/226005 A1, originally published 2020, p. 1-28 (Year: 2020).*

* cited by examiner

DISPLAY DEVICE INCLUDING DETECTION SENSOR AND METHOD OF MANUFACTURING THE DETECTION SENSOR

CROSS-REFERENCE TO RELATED APPLICATION

This U.S. non-provisional patent application claims priorities under 35 U.S.C. § 119 of Korean Patent Application No. 10-2020-0173400, filed on Dec. 11, 2020, the contents of which are hereby incorporated by reference in its entirety.

BACKGROUND

1. Field of Disclosure

The present disclosure relates to a display device including a detection sensor and a method of manufacturing the detection sensor. More particularly, the present disclosure relates to a display device including a detection sensor having improved light transmittance and a method of manufacturing the detection sensor.

2. Description of the Related Art

A display device provides various functions, such as displaying an image to provide information to a user or sensing a user's input, to communicate with the user. In recent years, display devices have a function of sensing a fingerprint of the user.

As a fingerprint recognition method, there are a capacitive method to sense a variation in capacitance formed between electrodes, an optical method to sense a light incident thereto using an optical sensor, and an ultrasonic method to sense a vibration using a piezoelectric substance. Nowadays, in the display devices, a detection sensor to recognize a fingerprint is disposed on a rear surface of the display panel.

SUMMARY

The present disclosure provides a display device including a detection sensor having improved light transmittance.

The present disclosure provides a method of manufacturing the detection sensor.

Embodiments of the inventive concept provide a method of manufacturing a detection sensor. The manufacturing method of the detection sensor includes forming a biometric information sensing layer including a transistor on a base layer, forming an initial optical pattern layer on the biometric information sensing layer, patterning the initial optical pattern layer to form a plurality of transmissive portions spaced apart from each other and having a first zeta potential, coating a light blocking material to form an initial light blocking portion that covers a side surface and an upper surface of the transmissive portions and has a second zeta potential different from the first zeta potential, spraying an abrasive having the first zeta potential on the initial light blocking portion, and polishing the initial light blocking portion such that the upper surface of the transmissive portions is exposed to form a light blocking portion. The initial light blocking portion is polished by the abrasive using a pad.

The first zeta potential is a negative (−) potential, and the second zeta potential is a positive (+) potential.

The abrasive includes about 0.005 wt % of polyacrylic acid (PAA) and about 0.005 wt % of polystyrene sulfonate (PSS).

The method further includes forming a sensing insulating layer to cover the transmissive portions and the light blocking portion after the forming of the light blocking portion.

The sensing insulating layer includes insulating patterns recessed in a same direction as the light blocking patterns.

The abrasive has a pH within a range of and including about 8 to about 9.

The light blocking portion includes light blocking patterns having a concave shape recessed in a direction toward the base layer between the transmissive portions.

Embodiments of the inventive concept provide a method of manufacturing a detection sensor. The manufacturing method of the detection sensor includes forming a biometric information sensing layer including a transistor on a base layer, forming an initial optical pattern layer on the biometric information sensing layer, patterning the initial optical pattern layer to form a plurality of transmissive portions spaced apart from each other and having a negative (−) zeta potential, coating a light blocking material to form an initial light blocking portion that covers a side surface and an upper surface of the transmissive portions and has a positive (+) zeta potential, spraying an abrasive having the negative (−) zeta potential on the initial light blocking portion, and polishing the initial light blocking portion such that the upper surface of the transmissive portions is exposed to form a light blocking portion. The initial light blocking portion is polished by the abrasive using a pad.

The abrasive includes about 0.005 wt % of polyacrylic acid (PAA) and about 0.005 wt % of polystyrene sulfonate (PSS).

The abrasive has an electric potential within a range of and including about −4 mV and to about −10 Mv.

The abrasive has a pH within a range of and including about 8 to about 9.

The light blocking portion includes light blocking patterns having a concave shape recessed in a direction toward the base layer between the transmissive portions.

Embodiments of the inventive concept provide a method of manufacturing a detection sensor. The manufacturing method of the detection sensor includes forming a biometric information sensing layer including a transistor on a base layer, forming an initial optical pattern layer on the biometric information sensing layer, patterning the initial optical pattern layer to form a plurality of transmissive portions spaced apart from each other, coating a light blocking material to form an initial light blocking portion that covers a side surface and an upper surface of the transmissive portions, spraying an abrasive on the initial light blocking portion, and polishing the initial light blocking portion to form a light blocking portion. The abrasive includes about 0.005 wt % of polyacrylic acid (PAA) and about 0.005 wt % of polystyrene sulfonate (PSS) or includes about 0.005 wt % of polyacrylic acid (PAA) and about 0.007 wt % of polystyrene sulfonate (PSS), and the initial light blocking portion is polished by the abrasive using a pad.

The upper surface of the transmissive portions is exposed by the polishing of the initial light blocking portion.

The light blocking portion includes light blocking patterns having a concave shape recessed in a direction toward the base layer between the transmissive portions.

Embodiments of the inventive concept provide a display device including a display module including a pixel and a detection sensor disposed under the display module and including a base layer, a biometric information sensing layer disposed on the base layer, an optical pattern layer disposed on the biometric information sensing layer, and a sensing insulating layer disposed on the optical pattern layer. The optical pattern layer includes a plurality of transmissive portions providing a light incident thereto through the display module from an outside to the biometric information sensing layer and a light blocking portion surrounding the transmissive portions. An upper surface of each of the transmissive portions is in contact with the sensing insulating layer.

The light blocking portion includes light blocking patterns each of which includes an upper surface that is covered by the sensing insulating layer and recessed in a direction toward the biometric information sensing layer from the display module.

A distance between the biometric information sensing layer and the light blocking patterns varies along one direction when viewed in a cross-section.

The transmissive portions are disposed on the light blocking portion and arranged spaced apart from each other in a first direction and a second direction crossing the first direction.

The biometric information sensing layer includes a transistor disposed on the base layer and including a plurality of electrodes and a sensing element connected to the transistor.

According to the above, during a chemical mechanical polishing (CMP) process, the transmissive portions and the abrasive have the first zeta potential that is the negative (−) zeta potential, and the initial light blocking portion has the second zeta potential that is the positive (+) zeta potential and opposite to the first zeta potential. Accordingly, the abrasive has a property that selectively adsorbs only the initial light blocking portion having the positive (+) zeta potential.

Thus, when the light blocking portion is formed, the initial light blocking portion is completely removed without leaving a residue thereof on the upper surface of the transmissive portions, and the upper surface of the transmissive portions is entirely exposed without being covered by the light blocking portion. Therefore, the detection sensor having improved light transmittance is manufactured.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
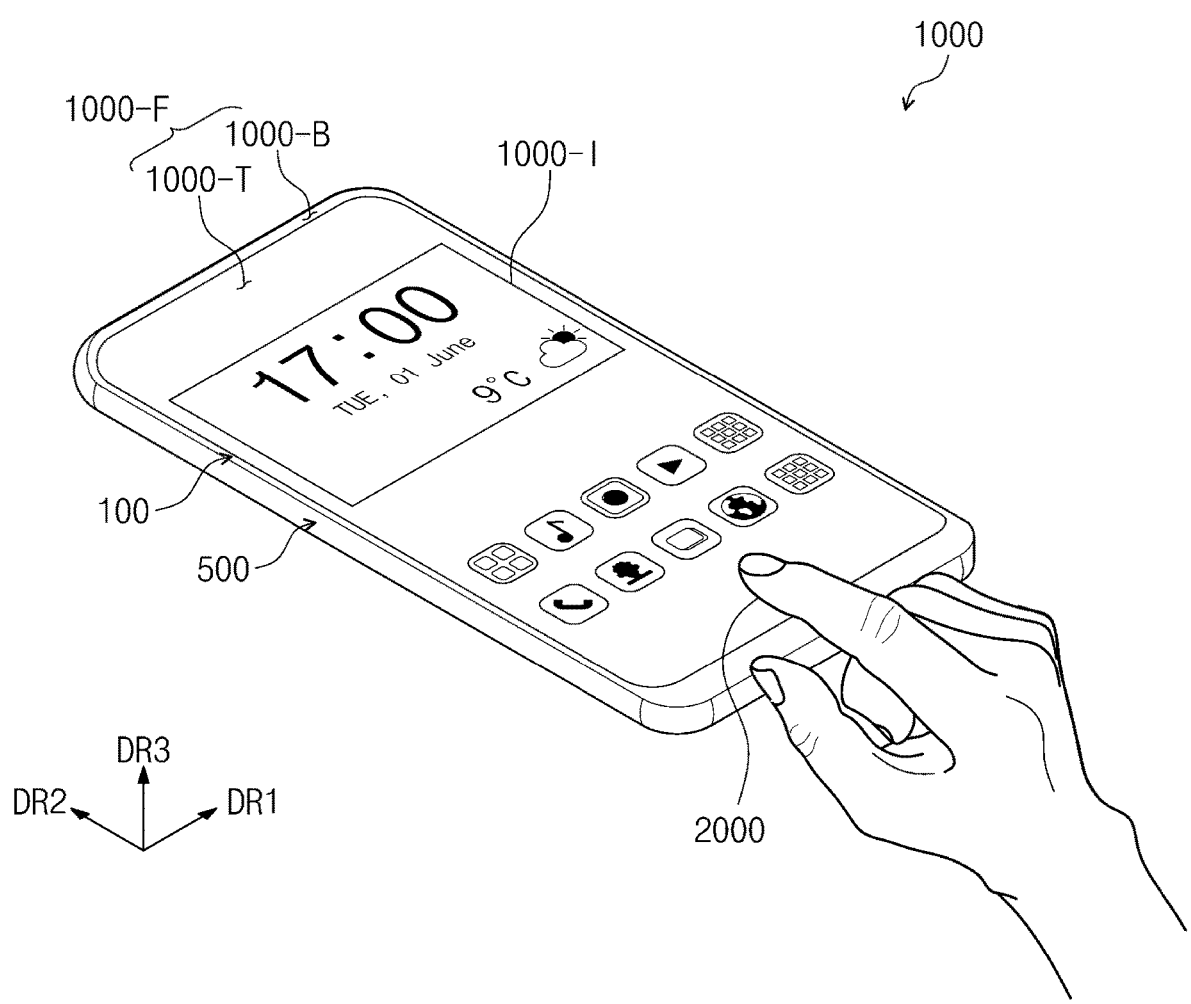
FIG. 1 is a perspective view showing a display device according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the word "or" means logical "or" so, unless the context indicates otherwise, the expression "A, B, or C" means "A and B and C," "A and B but not C," "A and C but not B," "B and C but not A," "A but not B and not C," "B but not A and not C," and "C but not A and not B."

It will be understood that, although the terms first, second, etc. may be used herein to describe various elements, components, regions, layers or sections, these elements, components, regions, layers or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "comprises," "comprising," "includes," and "including", when used in this specification, specify the presence of stated features, integers, steps, operations, elements, or components, but do not preclude the presence or addition of one or more other features, integers, steps, operations, elements, components, or groups thereof. Hereinafter, the present disclosure will be explained in detail with reference to the accompanying drawings.

Figure 2:
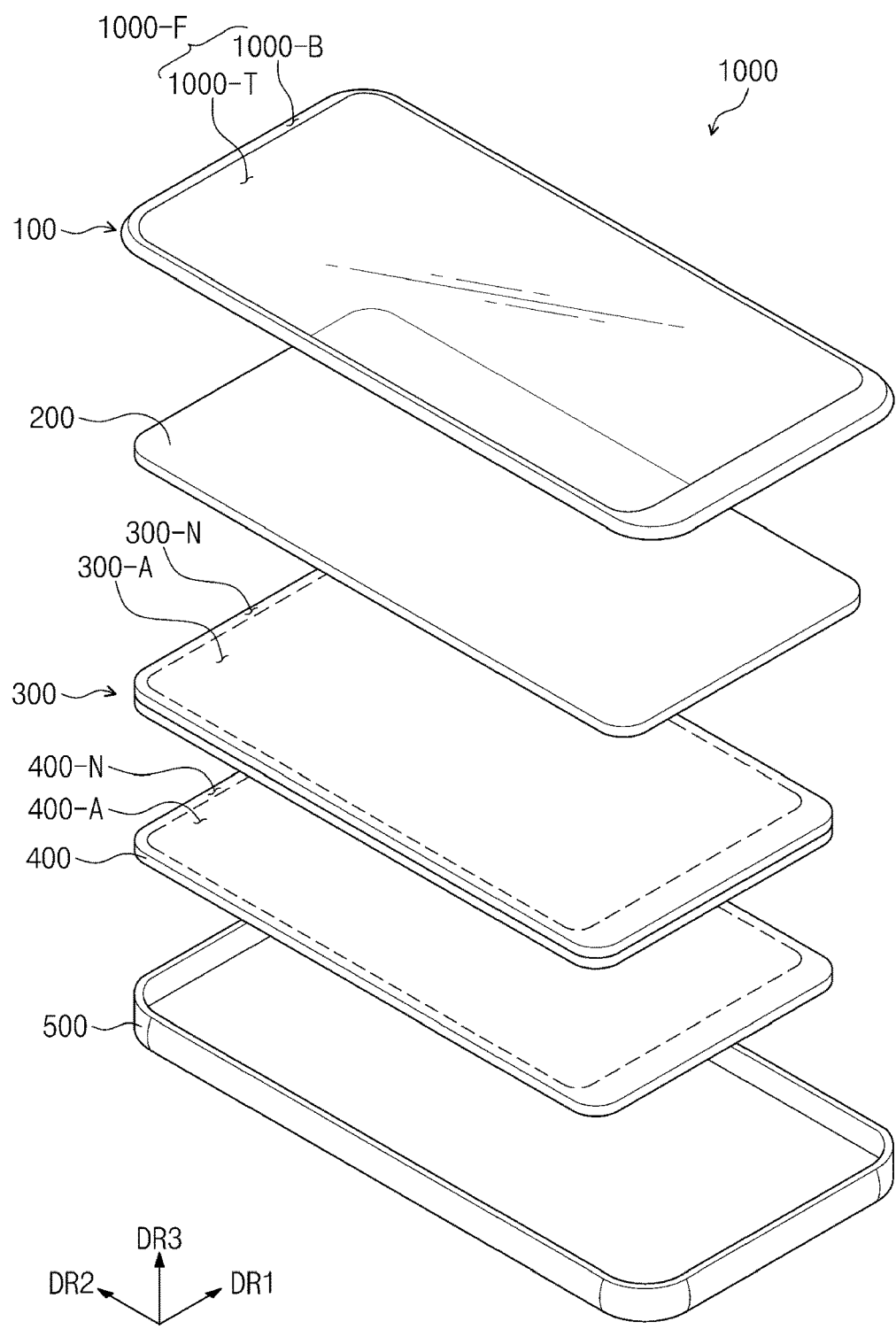
FIG. 2 is an exploded perspective view showing a display device according to an embodiment of the present disclosure.

FIG. 1 is a perspective view showing a display device 1000 according to an embodiment of the present disclosure, and FIG. 2 is an exploded perspective view showing the display device 1000 according to an embodiment of the present disclosure.

The display device 1000 may include various embodiments. For example, the display device 1000 may be applied to a large-sized electronic item, such as a television set, a monitor, or an outdoor billboard, and a small and medium-sized electronic item, such as a personal computer, a notebook computer, a personal digital assistant, a car navigation unit, a game unit, a mobile electronic device, and a camera. These are merely examples, and thus, the display device 1000 may be applied to other electronics as long as they do not depart from the concept of the present disclosure. In the present embodiment, a smartphone will be described as a representative example of the display device 1000.

The display device 1000 may display an image 1000-I through a display surface 1000-F, which is substantially parallel to each of a first direction DR1 and a second direction DR2, toward a third direction DR3. The image 1000-I may include a video and a still image. FIG. 1 shows a clock widget and application icons as a representative example of the image 1000-I. The display surface 1000-F through which the image 1000-I is displayed may correspond to a front surface of the display device 1000 and a front surface of a window 100.

In the present embodiment, front (or upper) and rear (or lower) surfaces of each member of the display device 1000 are defined with respect to a direction in which the image 1000-I is displayed. The front and rear surfaces face each other in the third direction DR3, and a normal line direction of each of the front and rear surfaces is substantially parallel to the third direction DR3. In the following descriptions, the expression "when viewed in a plane" may mean a state of being viewed in the third direction DR3.

The display device 1000 may sense a user input applied thereto from the outside. The user input may include a variety of inputs from the outside. For example, the user input may include an input (e.g., a hovering input) in proximity to or approaching close to the display device 1000 at a predetermined distance as well as a touch input by a user's body, e.g., a hand of a user. In addition, the user input may include various forms, such as pressure, or light, however, it should not be particularly limited. In addition, in accordance with a structure of the display device 1000, the display device 1000 may sense the user input applied to a side or rear surface of the display device 1000, however, it should not be particularly limited.

The display device 1000 may sense a user's fingerprint 2000 applied thereto from the outside. A fingerprint recognition area may be defined in the display surface 1000-F of the display device 1000. The fingerprint recognition area may be defined over an entire area of a transmissive area 1000-T or may be defined in some areas of the transmissive area 1000-T, however, it should not be particularly limited.

The display device 1000 may include the window 100, an anti-reflective panel 200, a display module 300, a detection sensor 400, and a housing 500. In the present embodiment, the window 100 and the housing 500 may be coupled to each other to provide an exterior of the display device 1000.

The window 100 may include an optically transparent insulating material. For example, the window 100 may include a glass or plastic material. The window 100 has a single-layer or multi-layer structure. As an example, the window 100 may include a plurality of plastic films attached to each other by an adhesive or a glass substrate and a plastic film attached to the glass substrate by an adhesive.

The front surface 1000-F of the window 100 may define the front surface of the display device 1000 as described above. The transmissive area 1000-T may be an optically transparent area. For example, the transmissive area 1000-T may be an area having a visible light transmittance of about 90% or more.

A bezel area 1000-B may be an area having a relatively lower transmittance as compared with the transmissive area 1000-T. The bezel area 1000-B may define a shape of the transmissive area 1000-T. The bezel area 1000-B may be disposed adjacent to the transmissive area 1000-T and surrounds the transmissive area 1000-T.

The bezel area 1000-B may have a predetermined color. The bezel area 1000-B may cover a peripheral area 300-N of the display module 300 to prevent the peripheral area 300-N from being viewed from the outside. However, this is merely one example, and the bezel area 1000-B may be omitted from the window 100 according to the embodiment of the present disclosure.

The anti-reflective panel 200 may be disposed under the window 100. The anti-reflective panel 200 may reduce a reflectance of an external light incident thereto from the above of the window 100. According to an embodiment, the anti-reflective panel 200 may be omitted or may be included in the display module 300.

The display module 300 may display the image 1000-I and sense the external input. The display module 300 may include an active area 300-A and the peripheral area 300-N. The active area 300-A may be an area activated in response to electrical signals.

According to an embodiment, the active area 300-A may be an area through which the image 1000-I is displayed, and substantially simultaneously, the external input is sensed. The transmissive area 1000-T may overlap the active area 300-A. For example, the transmissive area 1000-T may overlap an entire surface or at least a portion of the active area 300-A. Accordingly, the user may perceive the image 1000-I or provides the external input through the transmissive area 1000-T.

According to an embodiment, an area through which the image 1000-I is displayed and an area through which the external input is sensed may be separated from each other in the active area 300-A, but they should not be limited to a particular embodiment.

The peripheral area 300-N may be covered by the bezel area 1000-B. The peripheral area 300-N may be disposed adjacent to the active area 300-A. The peripheral area 300-N may surround the active area 300-A. A driving circuit or a driving wiring line may be disposed in the peripheral area 300-N to drive the active area 300-A.

The detection sensor 400 may be disposed under the display module 300. The detection sensor 400 may be a layer to sense biometric information of the user. The detection sensor 400 may sense a surface of an object that touches thereon. The surface may include uniformity of a surface or a concave-convex shape of a surface. For example, the surface may include information on the user's fingerprint 2000.

The detection sensor 400 may include a sensing area 400-A and a non-sensing area 400-N. The sensing area 400-A may be activated in response to electrical signals. As an example, the sensing area 400-A may be an area in which the biometric information are sensed. A driving circuit or a driving wiring line may be disposed in the non-sensing area 400-N to drive the sensing area 400-A.

According to an embodiment, the sensing area 400-A may entirely overlap the active area 300-A. In this case, the fingerprint recognition may be available in the entire area of the active area 300-A. That is, the user's fingerprint may be recognized in the entire area rather than in some areas designated specifically, however, the present disclosure should not be limited thereto or thereby. According to an embodiment, for example, the sensing area 400-A of the detection sensor 400 may overlap a portion of the active area 300-A.

The housing 500 may be coupled with the window 100. The housing 500 may be coupled with the window 100 to provide an inner space therebetween. The display module 300 and the detection sensor 400 may be accommodated in the inner space. The housing 500 may stably protect components of the display device 1000 accommodated in the inner space thereof. The housing 500 may include a material having a relatively high rigidity. For example, the housing 500 may include a plurality of frames or plates of a glass, plastic, or metal material or a combination thereof.

Although not shown in figures, a battery module may be disposed between the detection sensor 400 and the housing 500 to supply a power source required for an overall operation of the display device 1000.

Figure 3:
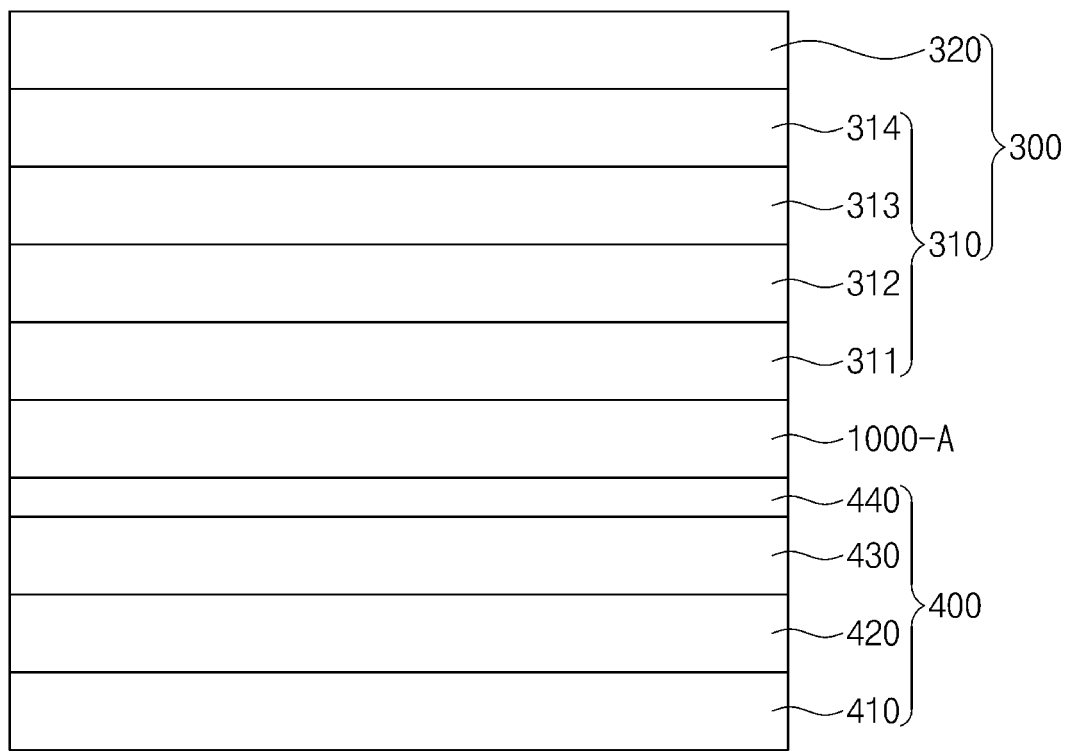
FIG. 3 is a cross-sectional view schematically showing a display device according to an embodiment of the present disclosure.
Figure 3:
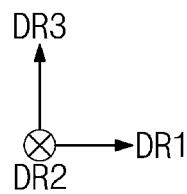
Figure 4:
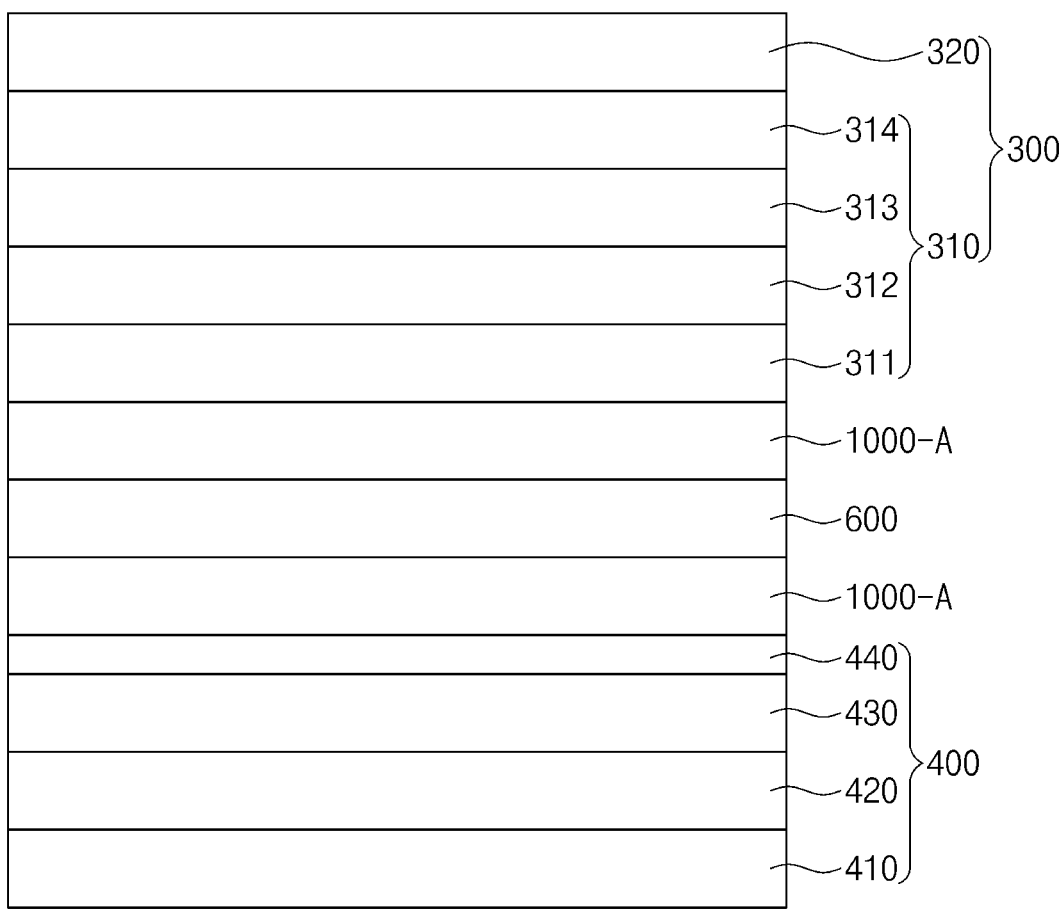
FIG. 4 is a cross-sectional view schematically showing a display device according to an embodiment of the present disclosure.

FIG. 3 is a cross-sectional view schematically showing a display device according to an embodiment of the present disclosure, and FIG. 4 is a cross-sectional view schematically showing a display device according to an embodiment of the present disclosure.

Referring to FIG. 3, a display module 300 may include a display panel 310 and an input sensing layer 320.

The display panel 310 may be a layer to provide an image. The active area 300-A (refer to FIG. 2) of the display module 300 may correspond to an active area of the display panel 310. That is, the sensing area 400-A (refer to FIG. 2) of the detection sensor 400 may entirely overlap the active area of the display panel 310.

The display panel 310 may include a base layer 311, a circuit layer 312, a light emitting element layer 313, and an encapsulation layer 314.

The base layer 311 may include a synthetic resin film. A synthetic resin layer may include a heat-curable resin. Particularly, the synthetic resin layer may be a polyimide-based resin layer, however, it should not be particularly limited. The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. In addition, the base layer BL may include a glass substrate, a metal substrate, or an organic/inorganic composite substrate.

The circuit layer 312 may be disposed on the base layer 311. The circuit layer 312 may include a pixel circuit and insulating layers. The pixel circuit may include at least one transistor and at least one capacitor.

The light emitting element layer 313 may be disposed on the circuit layer 312. The light emitting element layer 313 may emit a light. The light emitting element layer 313 may emit the light or may control an amount of the light according to an electrical signal. When the display panel 310 is an organic light emitting display panel, the light emitting element layer 313 may include an organic light emitting material. When the display panel 310 is a quantum dot light emitting display panel, the light emitting element layer 313 may include a quantum dot and a quantum rod.

The encapsulation layer 314 may be disposed on the light emitting element layer 313. The encapsulation layer 314 may include at least one insulating layer. As an example, the encapsulation layer 314 may include at least one inorganic layer and at least one organic layer. The inorganic layer may protect the light emitting element layer 313 from moisture and oxygen, and the organic layer may protect the light emitting element layer 313 from foreign substances such as dust particles.

The input sensing layer 320 may be disposed on the display panel 310. The input sensing layer 320 may sense the external input to obtain position information about the external input. The external input may include inputs of various forms. For example, the external input may be external inputs of various forms, such as a portion of a user's body, light, heat, pressure, or a combination thereof. In addition, the input sensing layer 320 may sense an input approaching the window 100 as well as an input touching the window 100 (refer to FIG. 2).

The input sensing layer 320 may be disposed directly on the display panel 310. As an example, the input sensing layer 320 may be formed together with the display panel 310 through successive processes. According to an embodiment, the input sensing layer 320 may be attached to the display panel 310. In this case, an adhesive layer may be further disposed between the input sensing layer 320 and the display panel 310.

The detection sensor 400 may be disposed under the display module 300. As an example, the detection sensor 400 may be attached to a rear surface of the display panel 310. An adhesive layer 1000-A may be disposed between the detection sensor 400 and the display panel 310. The adhesive layer 1000-A may include one of a pressure sensitive adhesive (PSA), an optical clear adhesive (OCA), and an optical clear resin (OCR).

The detection sensor 400 may include a base layer 410, a biometric information sensing layer 420, an optical pattern layer 430, and a sensing insulating layer 440.

The base layer 410 may be a synthetic resin layer. The synthetic resin layer may include a heat-curable resin. Particularly, the synthetic resin layer may be a polyimide-based resin layer, however, it should not be particularly limited. As an example, the base layer 410 may include two polyimide-based resin layers and a barrier layer disposed between the polyimide-based resin layers. The barrier layer may include amorphous silicon and silicon oxide.

The biometric information sensing layer 420 may be disposed on the base layer 410. The biometric information sensing layer 420 may include a sensing circuit and insulating layers. The sensing circuit may include at least one transistor and at least one photodiode.

The optical pattern layer 430 may be disposed directly on the biometric information sensing layer 420. As an example, the optical pattern layer 430 and the biometric information sensing layer 420 may be formed through successive processes. The optical pattern layer 430 may filter a light incident into the biometric information sensing layer 420. As an example, an incident angle of the light exiting from the optical pattern layer 430 may be controlled by the optical pattern layer 430. As an example, the incident angle may be restricted to a predetermined angle or less. As the incident angle is limited, a fingerprint recognition accuracy may be improved.

The sensing insulating layer 440 may be disposed on the optical pattern layer 430. The sensing insulating layer 440 may provide a flat surface on the optical pattern layer 430 to allow the detection sensor 400 to be easily coupled with the display module 300. In addition, the sensing insulating layer 440 may control a refractive index of the light provided to the biometric information sensing layer 420 after transmitting through the display module 300. The sensing insulating layer 440 may include one of a high refractive index resin and an inorganic layer including an inorganic material. The inorganic material may include, for example, silicon nitride, silicon oxide, or compounds thereof. The inorganic layers may be formed through a deposition process.

FIG. 4 is a cross-sectional view schematically showing a display device according to an embodiment of the present disclosure. In FIG. 4, the same reference numerals denote the same elements in FIG. 3, and thus, detailed descriptions of the same elements will be omitted.

Referring to FIG. 4, an infrared filter 600 may be further disposed between the display module 300 and the detection sensor 400. The infrared filter 600 may block infrared light and may transmit visible light.

The light reflected by the user's fingerprint 2000 (refer to FIG. 1) may be the visible light. According to the present embodiment, as the infrared filter 600 blocks a light having a wavelength band which does not correspond to a wavelength band of the light reflected by the user's fingerprint 2000, the fingerprint recognition accuracy of the biometric information sensing layer 420 may be improved.

The adhesive layer 1000-A may be disposed between the infrared filter 600 and the display module 300 and between the infrared filter 600 and the detection sensor 400.

Figure 5:
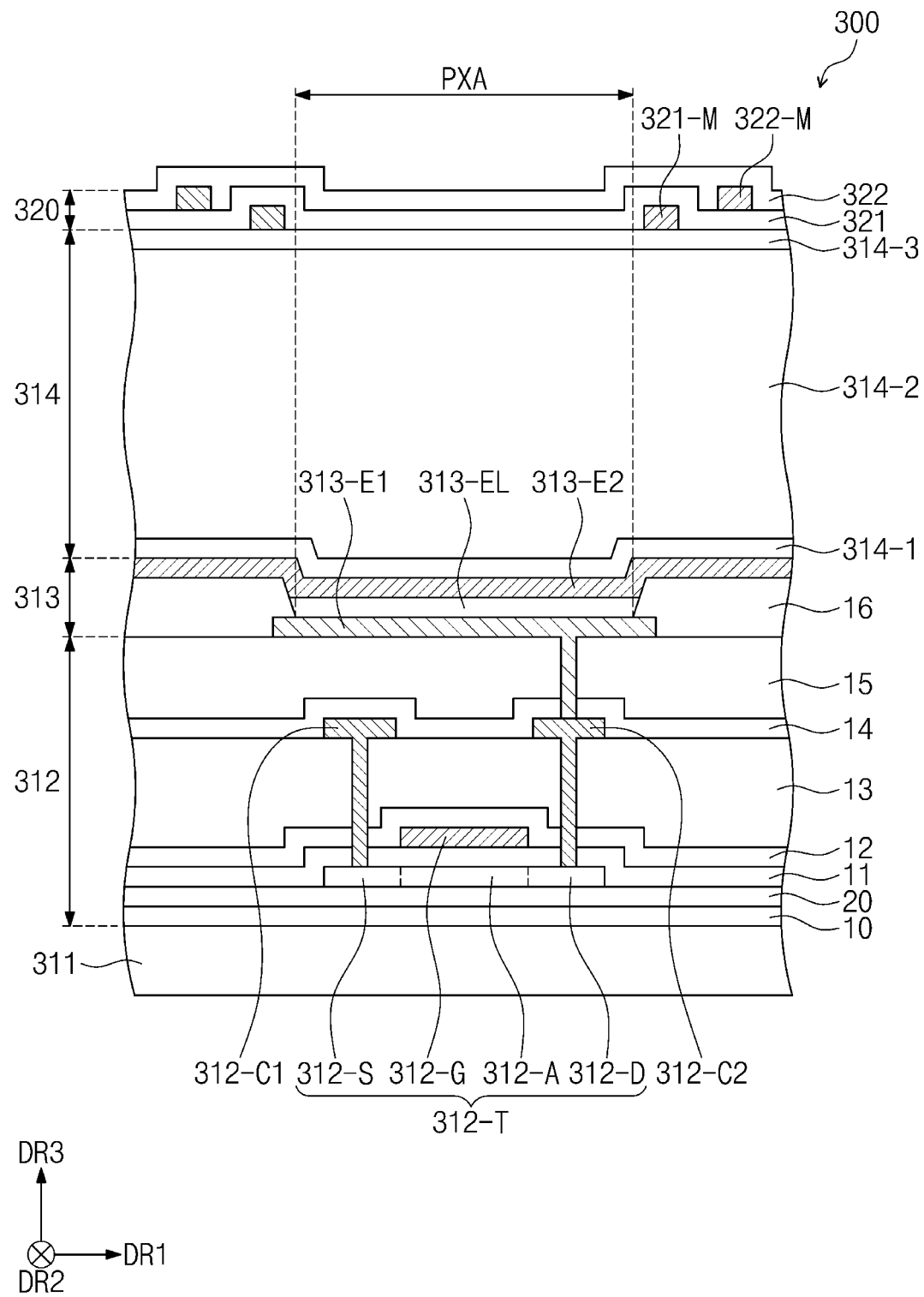
FIG. 5 is a cross-sectional view showing a display module according to an embodiment of the present disclosure.

FIG. 5 is a cross-sectional view showing the display module 300 according to an embodiment of the present disclosure.

Referring to FIG. 5, the display module 300 may include the base layer 311, the circuit layer 312, the light emitting element layer 313, the encapsulation layer 314, and the input sensing layer 320. The circuit layer 312, the light emitting element layer 313, the encapsulation layer 314, and the input sensing layer 320 may be sequentially stacked on the base layer 311.

A barrier layer 10 may be disposed on the base layer 311. The barrier layer 10 may prevent a foreign substance from entering. The barrier layer 10 may include at least one of a silicon oxide layer and a silicon nitride layer. Each of the silicon oxide layer and the silicon nitride layer may be provided in plural, and the silicon oxide layers may be alternately stacked with the silicon nitride layers.

A buffer layer 20 may increase a coupling force between the base layer 311 and a semiconductor pattern or a conductive pattern. The buffer layer 20 may include at least one of a silicon oxide layer and a silicon nitride layer, and the silicon oxide layer and the silicon nitride layer may be alternately stacked with each other.

A transistor 312-T of the pixel circuit may be disposed on the buffer layer 20. The transistor 312-T may include an active 312-A, a source 312-S, a drain 312-D, and a gate 312-G.

The semiconductor pattern 312-S, 312-A, and 312-D may be disposed on the buffer layer 20. The semiconductor pattern 312-S, 312-A, and 312-D disposed directly on the buffer layer 20 may include silicon semiconductor, polysilicon semiconductor, or amorphous silicon semiconductor. The semiconductor pattern 312-S, 312-A, and 312-D may have different electrical properties depending on whether it is doped or not or whether it is doped with an N-type dopant or a P-type dopant. The semiconductor pattern may include a doped region and a non-doped region. The doped region may be doped with the N-type dopant or the P-type dopant. A P-type transistor may include the doped region doped with the P-type dopant.

The doped region may have a conductivity greater than that of the non-doped region and may substantially serve as an electrode or signal line. The non-doped region may substantially correspond to an active (or a channel) of the transistor. In other words, a portion of the semiconductor pattern 312-S, 312-A, and 312-D may be the active 312-A of the transistor 312-T, another portion of the semiconductor pattern 312-S, 312-A, and 312-D may be the source 312-S or the drain 312-D of the transistor 312-T, and the other portion of the semiconductor pattern 312-S, 312-A, and 312-D may be a connection signal line (or a connection electrode).

A first insulating layer 11 may be disposed on the buffer layer 20. The first insulating layer 11 may cover the semiconductor pattern 312-S, 312-A, and 312-D. The first insulating layer 11 may be an inorganic layer or an organic layer and may have a single-layer or multi-layer structure. The first insulating layer 11 may include at least one of aluminum oxide, titanium oxide, silicon oxide, silicon oxynitride, zirconium oxide, and hafnium oxide. According to the present embodiment, the first insulating layer 11 may have a single-layer structure of a silicon oxide layer. An inorganic layer described later may include at least one of the above-mentioned materials.

The gate 312-G may be disposed on the first insulating layer 11. The gate 312-G may be a portion of a metal pattern. The gate 312-G may overlap the active 312-A when viewed in a plane. The gate 312-G may be used as a mask in a process of doping the semiconductor pattern.

A second insulating layer 12 may be disposed on the first insulating layer 11 and may cover the gate 312-G. The second insulating layer 12 may be an inorganic layer and may have a single-layer or multi-layer structure. In the present embodiment, the second insulating layer 12 may have a single-layer structure of a silicon oxide layer.

A third insulating layer 13 may be disposed on the second insulating layer 12. In the present exemplary embodiment, the third insulating layer 13 may be an organic layer and may have a single-layer structure or multi-layer structure. As an example, the third insulating layer 13 may have the single-layer structure of a polyimide-based resin layer, however, it should not be limited thereto or thereby. The third insulating layer 13 may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. An organic layer described later may include at least one of the above-mentioned materials.

A first connection electrode 312-C1 and a second connection electrode 312-C2 may be disposed on the third insulating layer 13. Each of the first connection electrode 312-C1 and the second connection electrode 312-C2 may be electrically connected to the transistor 312-T after penetrating through the first, second, and third insulating layers 11, 12, and 13.

A fourth insulating layer 14 may be disposed on the third insulating layer 13 and may cover the first connection electrode 312-C1 and the second connection electrode 312-C2. The fourth insulating layer 14 may be an inorganic layer.

A fifth insulating layer 15 may be disposed on the fourth insulating layer 14. The fifth insulating layer 15 may be an organic layer and may have a single-layer or multi-layer structure.

The light emitting element layer 313 may be disposed on the fifth insulating layer 15. The light emitting element layer 313 may include a first electrode 313-E1, a light emitting layer 313-EL, and a second electrode 313-E2.

The first electrode 313-E1 may be electrically connected to the transistor 312-T after penetrating through the fourth insulating layer 14 and the fifth insulating layer 15. The first electrode 313-E1 may overlap Y or more transmissive portions 431 (refer to FIG. 6). The Y may be a positive integer number, and the transmissive portions 431 (refer to FIG. 6) will be described later.

A pixel definition layer 16 may be disposed on the fifth insulating layer 15. The pixel definition layer 16 may be provided with an opening defined therethrough to expose the first electrode 313-E1. When viewed in a plane, a shape of the opening may correspond to a pixel area PXA.

The light emitting layer 313-EL may be disposed on the first electrode 313-E1. The light emitting layer 313-EL may provide a predetermined color. In the present embodiment, the light emitting layer 313-EL that is patterned and has the single-layer structure is shown as a representative example, however, the present disclosure should not be limited thereto or thereby. As another example, the light emitting layer 313-EL may have the multi-layer structure. In addition, the light emitting layer 313-EL may extend toward an upper surface of the pixel definition layer 16.

The second electrode 313-E2 may be disposed on the light emitting layer 313-EL. Although not shown in figures, an electron control layer may be disposed between the second electrode 313-E2 and the light emitting layer 313-EL, and a hole control layer may be disposed between the first electrode 313-E1 and the light emitting layer 313-EL.

According to an embodiment, each of the first electrode 313-E1 and the second electrode 313-E2 may include a transparent conductive material. As an example, each of the first electrode 313-E1 and the second electrode 313-E2 may include at least one of indium tin oxide (ITO), indium zinc oxide (IZO), indium gallium oxide (IGO), indium zinc gallium oxide (IGZO), and mixtures/compounds thereof, however, the present disclosure should not be limited thereto or thereby.

The encapsulation layer 314 may be disposed on the second electrode 313-E2. The encapsulation layer 314 may include a first inorganic layer 314-1, an organic layer 314-2, and a second inorganic layer 314-3.

The first inorganic layer 314-1 may be disposed on the second electrode 313-E2. The organic layer 314-2 may be disposed on the first inorganic layer 314-1. The second inorganic layer 314-3 may be disposed on and may cover the organic layer 314-2. The first inorganic layer 314-1 and the second inorganic layer 314-3 may include a silicon nitride layer, a silicon oxynitride layer, a silicon oxide layer, a titanium oxide layer, or an aluminum oxide layer, however, they should not be limited thereto or thereby. The organic layer 314-2 may include an acrylic-based organic layer, however, it should not be particularly limited. The first inorganic layer 314-1 and the second inorganic layer 314-3 may protect light emitting layer 313-EL from moisture and oxygen, and the organic layer 314-2 may protect light emitting layer 313-EL from a foreign substance such as dust particles.

The input sensing layer 320 may be disposed on the encapsulation layer 314. The input sensing layer 320 may include a first conductive layer 321-M, a first sensing insulating layer 321, a second conductive layer 322-M, and a second sensing insulating layer 322. At least one of the first conductive layer 321-M and the second conductive layer 322-M may include sensing electrodes. The input sensing layer 320 may obtain information about the external input based on a variation in capacitance between the sensing electrodes.

Figure 6:
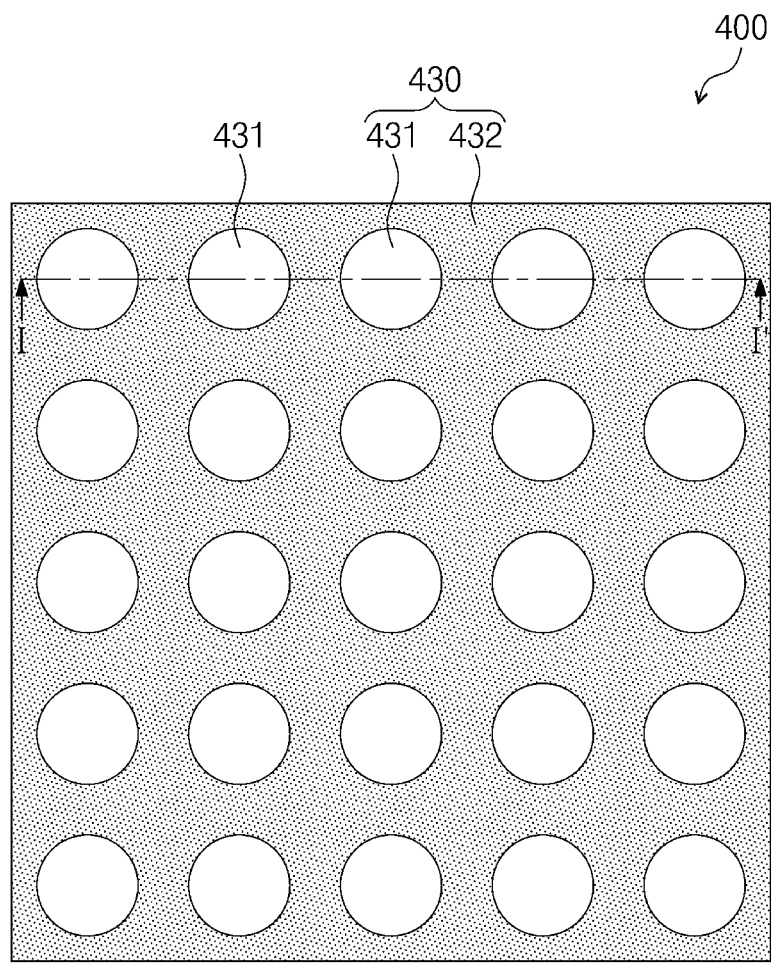
FIG. 6 is a plan view showing an optical pattern layer according to an embodiment of the present disclosure.
Figure 7:
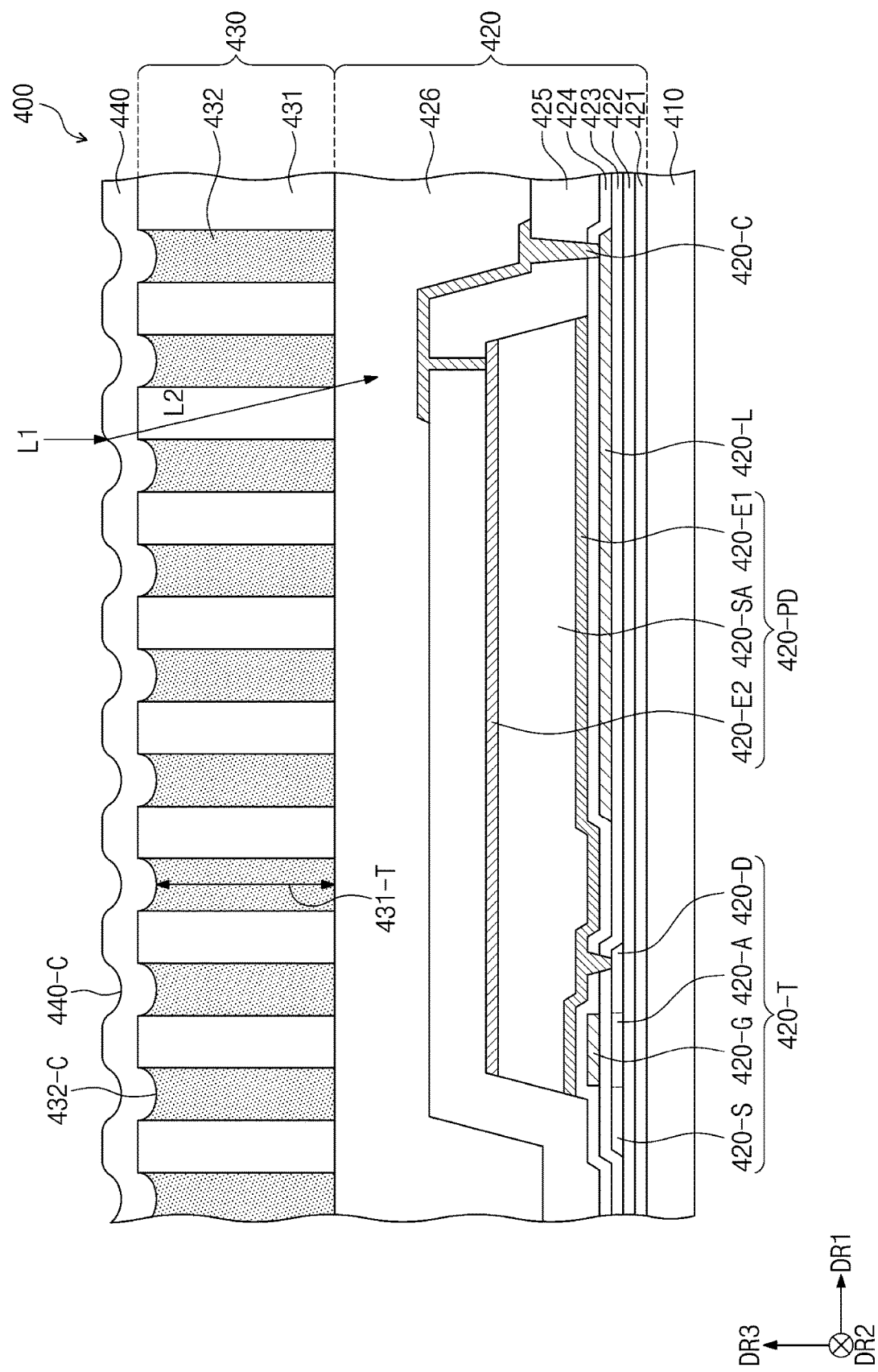
FIG. 7 is a cross-sectional view showing a detection sensor according to an embodiment of the present disclosure.

FIG. 6 is a plan view showing the optical pattern layer 430 according to an embodiment of the present disclosure, and FIG. 7 is a cross-sectional view showing the detection sensor 400 according to an embodiment of the present disclosure.

Referring to FIGS. 6 and 7, the optical pattern layer 430 of the detection sensor 400 may include the transmissive portions 431 and a light blocking portion 432 surrounding the transmissive portions 431.

The transmissive portions 431 may be arranged in the first direction DR1 and the second direction DR2. As an example, the transmissive portions 431 may be arranged in a matrix form, however, they should not be limited thereto or thereby. As another example, the transmissive portions 431 arranged in the same row along the first direction DR1 may be more shifted in the first direction DR1 than the transmissive portions 431 spaced apart from each other in the second direction DR2, and thus, the transmissive portions 431 may be arranged in a zigzag shape, however, they should not be limited thereto or thereby.

When viewed in a plane, each of the transmissive portions 431 may have a circular shape. However, the shape of the transmissive portions 431 should not be limited thereto or thereby, and each of the transmissive portions 431 may have a variety of shapes, such as an oval shape, a polygonal shape, or the like.

The detection sensor 400 may include the base layer 410, the biometric information sensing layer 420 disposed on the base layer 410, the optical pattern layer 430 disposed on the biometric information sensing layer 420, and the sensing insulating layer 440 disposed on the optical pattern layer 430. According to an embodiment, the sensing insulating layer 440 may cover an entire surface of the optical pattern layer 430. The base layer 410 may be the same as the base layer 410 described with reference to FIG. 4.

A barrier layer 421 may be disposed on the base layer 410. A buffer layer 422 may be disposed on the barrier layer 421. Descriptions on the barrier layer 421 and the buffer layer 422 may correspond to the descriptions on the barrier layer 10 and the buffer layer 20 described with reference to FIG. 5.

A transistor 420-T may be disposed on the buffer layer 422. The transistor 420-T may include an active 420-A, a source 420-S, a drain 420-D, and a gate 420-G. The active 420-A, the source 420-S, and the drain 420-D may be disposed on the buffer layer 422.

A first insulating layer 423 may be disposed on the buffer layer 422 and may cover the active 420-A, the source 420-S, and the drain 420-D. The first insulating layer 423 may include an inorganic layer or an organic layer and may have a single-layer or multi-layer structure. According to an embodiment, the first insulating layer 423 may have a single-layer structure of a silicon oxide layer.

The gate 420-G and a wiring layer 420-L may be disposed on the first insulating layer 423. The wiring layer 420-L may receive a predetermined voltage, e.g., a bias voltage. The wiring layer 420-L may be electrically connected to a sensing element 420-PD described later.

The second insulating layer 424 may be disposed on the first insulating layer 423 and may cover the gate 420-G and the wiring layer 420-L. The second insulating layer 424 may be an inorganic layer and may have a single-layer or multi-layer structure. According to an embodiment, the second insulating layer 424 may have a single-layer structure of a silicon oxide layer.

The sensing element 420-PD may be disposed on the second insulating layer 424. The sensing element 420-PD may be electrically connected to the transistor 420-T and the wiring layer 420-L. As an example, an operation of the sensing element 420-PD may be controlled by a signal applied thereto from the transistor 420-T and may receive a predetermined voltage from the wiring layer 420-L. The sensing element 420-PD may be referred to as a sensor.

The sensing element 420-PD may include a first sensing electrode 420-E1, a sensing layer 420-SA, and a second sensing electrode 420-E2.

The first sensing electrode 420-E1 may be electrically connected to the transistor 420-T after penetrating through the first and second insulating layers 422 and 423. The first sensing electrode 420-E1 may include an opaque conductive material. As an example, the first sensing electrode 420-E1 may include molybdenum (Mo).

The sensing layer 420-SA may be disposed on the first sensing electrode 420-E1. The sensing layer 420-SA may include amorphous silicon.

The second sensing electrode 420-E2 may be disposed on the sensing layer 420-SA. The second sensing electrode 420-E2 may include a transparent conductive material. As an example, the second sensing electrode 420-E2 may include indium tin oxide (ITO).

A third insulating layer 425 may be disposed on the second sensing electrode 420-E2. The third insulating layer 425 may be an inorganic layer and may have a single-layer or multi-layer structure. As an example, the third insulating layer 425 may include a silicon oxide layer and a silicon nitride layer.

A connection electrode 420-C may be disposed on the third insulating layer 425. The connection electrode 420-C may be electrically connected to the second sensing electrode 420-E2 after penetrating through the third insulating layer 425. In addition, the connection electrode 420-C may be electrically connected to the wiring layer 420-L after penetrating through the second and third insulating layers 424 and 425.

A fourth insulating layer 426 may be disposed on the third insulating layer 425 and may cover the connection electrode 420-C. The fourth insulating layer 426 may be an organic layer and may have a single-layer or multi-layer structure. As an example, the fourth insulating layer 426 may have the single-layer structure of a polyimide-based resin layer.

The optical pattern layer 430 may be disposed on the biometric information sensing layer 420. As an example, the optical pattern layer 430 may be disposed directly on the fourth insulating layer 426. That is, the optical pattern layer 430 and the biometric information sensing layer 420 may be formed through successive processes.

According to an embodiment, since the optical pattern layer 430 is disposed directly on the biometric information sensing layer 420, a distance between the optical pattern layer 430 and the second sensing electrode 420-E2 may be reduced. As a result, interferences between lights passing through the optical pattern layer 430 may be prevented or reduced, and thus, the fingerprint recognition accuracy may be improved.

As described above, the optical pattern layer 430 may include the transmissive portions 431 and the light blocking portion 432 surrounding the transmissive portions 431. The transmissive portions 431 may have an optical transparency, and the light blocking portion 432 may have a property of absorbing light. The light reflected by the fingerprint 2000 may be incident into the sensing element 420-PD after passing through the transmissive portions 431.

The light blocking portion 432 may include light blocking patterns 432-C recessed in a direction from the display module 300 to the biometric information sensing layer 420, i.e., the third direction DR3. The light blocking patterns 432-C may have a concave shape in a direction toward the base layer 410 between the transmissive portions 431, i.e., the third direction DR3.

The concave shape of the light blocking patterns 432-C may be caused by a surface tension between the transmissive portions 431 and an organic material adjacent to the transmissive portions 431 and an amount of the organic material when the light blocking patterns 432-C are formed by coating the organic material including a light blocking material. As the light blocking patterns 432-C have the concave shape, a distance between the biometric information sensing layer 420 and the light blocking patterns 432-C may vary in the first direction DR1 and the second direction DR2.

According to an embodiment, the sensing insulating layer 440 may include insulating patterns 440-C recessed in a direction toward the biometric information sensing layer 420 from the display module 300, i.e., the third direction DR3. Accordingly, the insulating patterns 440-C may be recessed in the same direction as the light blocking patterns 432-C. In addition, according to an embodiment, the insulating patterns 440-C and the light blocking patterns 432-C may overlap each other in the third direction DR3. The sensing insulating layer 440 may include one of a resin and an inorganic material.

The insulating patterns 440-C may be formed to correspond to the shape of the light blocking patterns 432-C. The insulating patterns 440-C may be disposed on the light blocking patterns 432-C, and the insulating patterns 440-C may overlap the light blocking portion 432 and may be spaced apart from the transmissive portions 431.

Figure 8A:
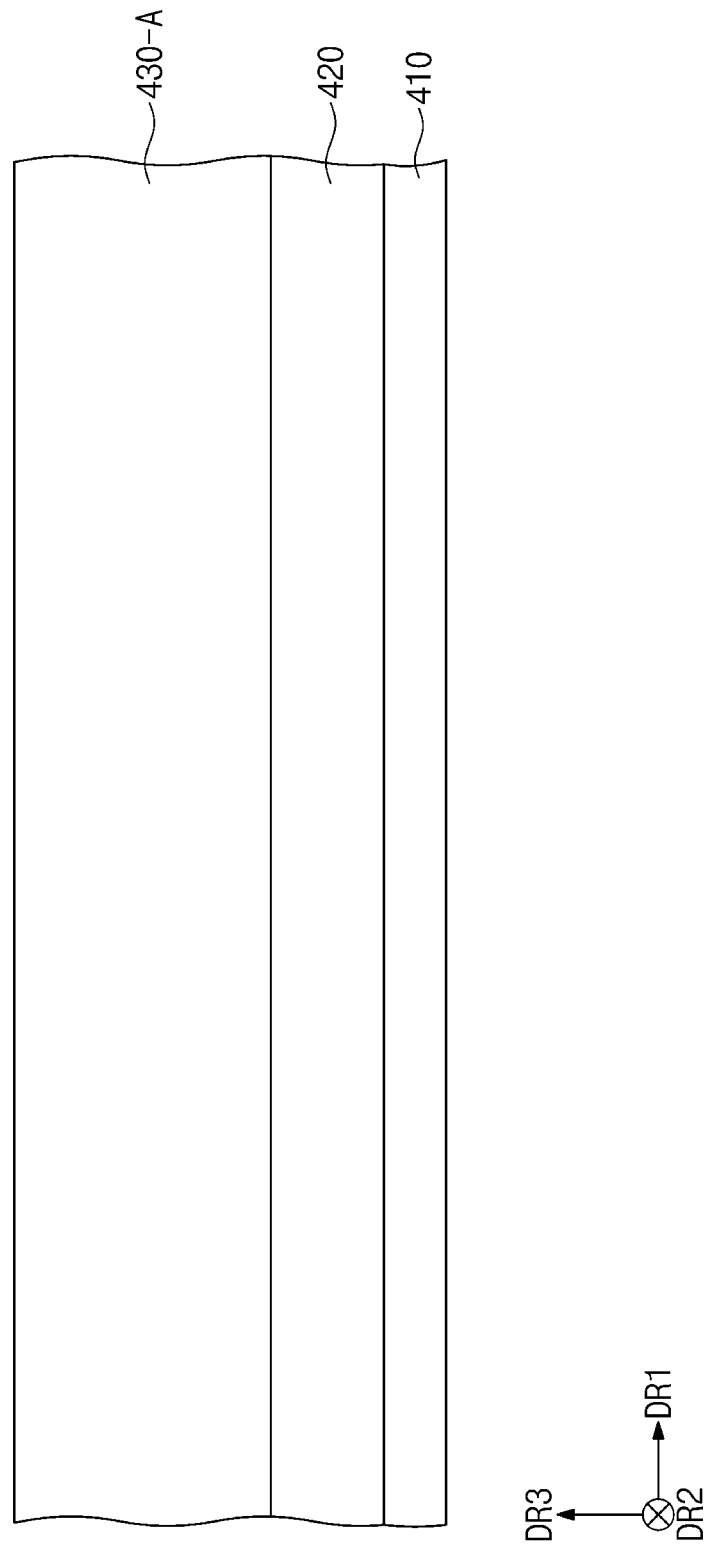
FIG. 8A is a cross-sectional view showing a method of manufacturing a detection sensor according to an embodiment of the present disclosure.
Figure 8B:
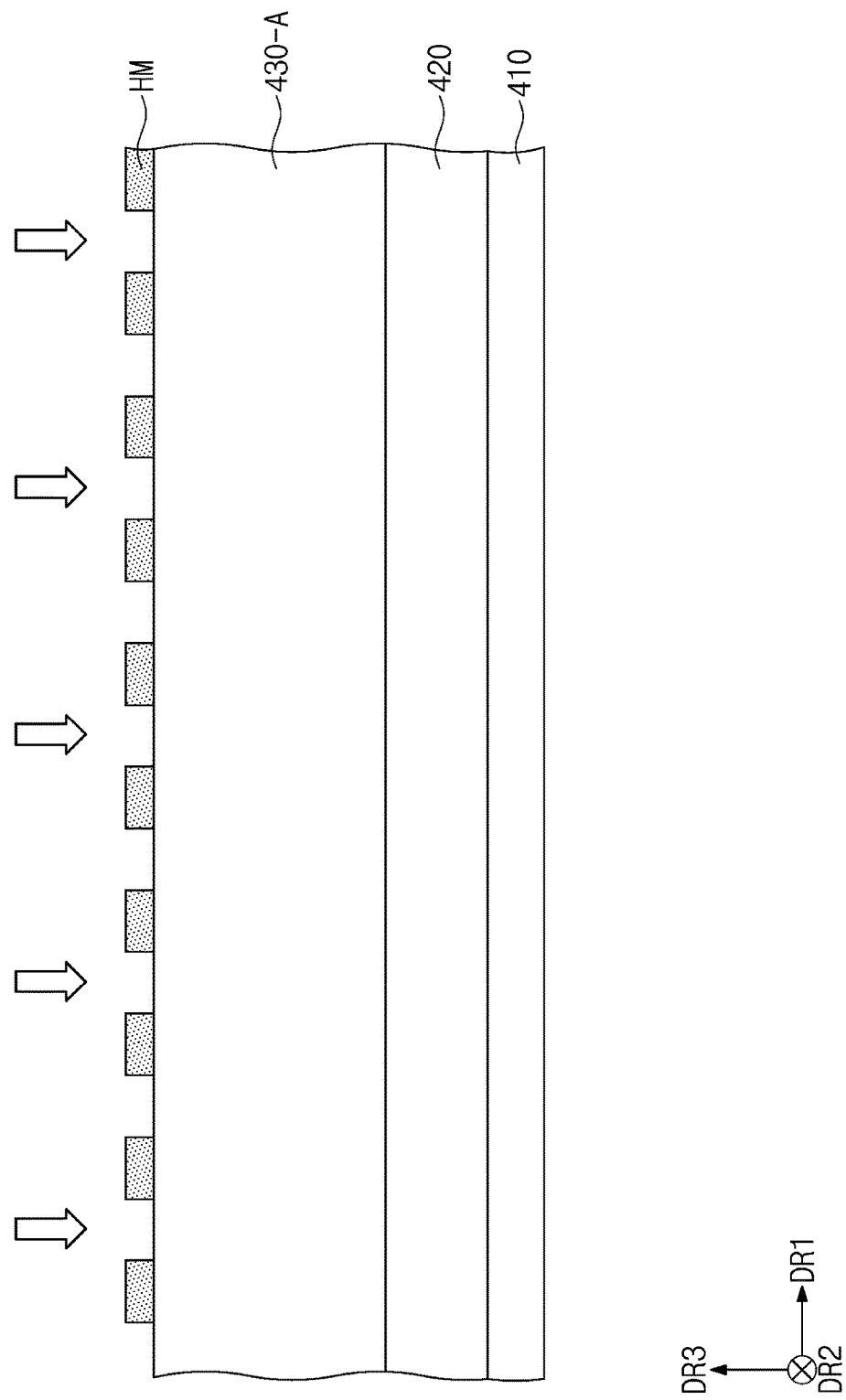
FIG. 8B is a cross-sectional view showing a method of manufacturing a detection sensor according to an embodiment of the present disclosure.
Figure 8C:
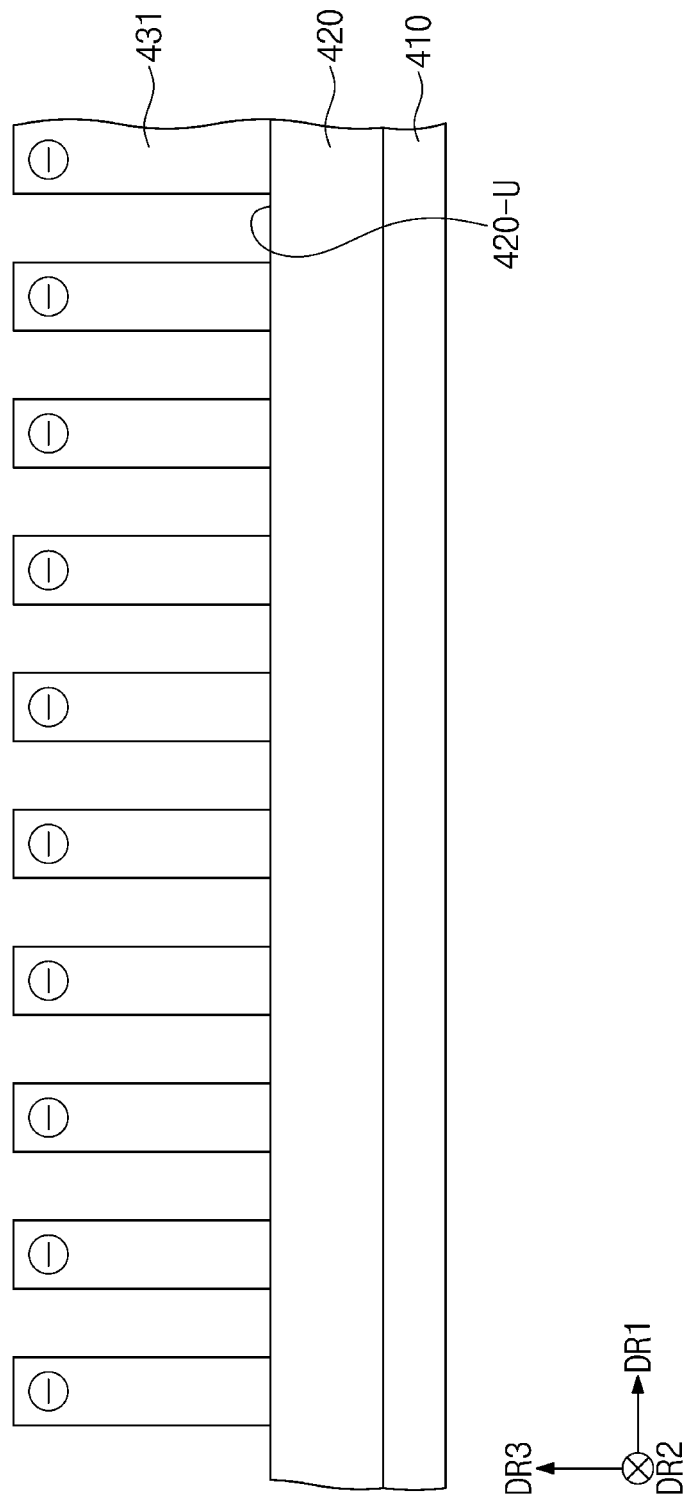
FIG. 8C is a cross-sectional view showing a method of manufacturing a detection sensor according to an embodiment of the present disclosure.
Figure 8D:
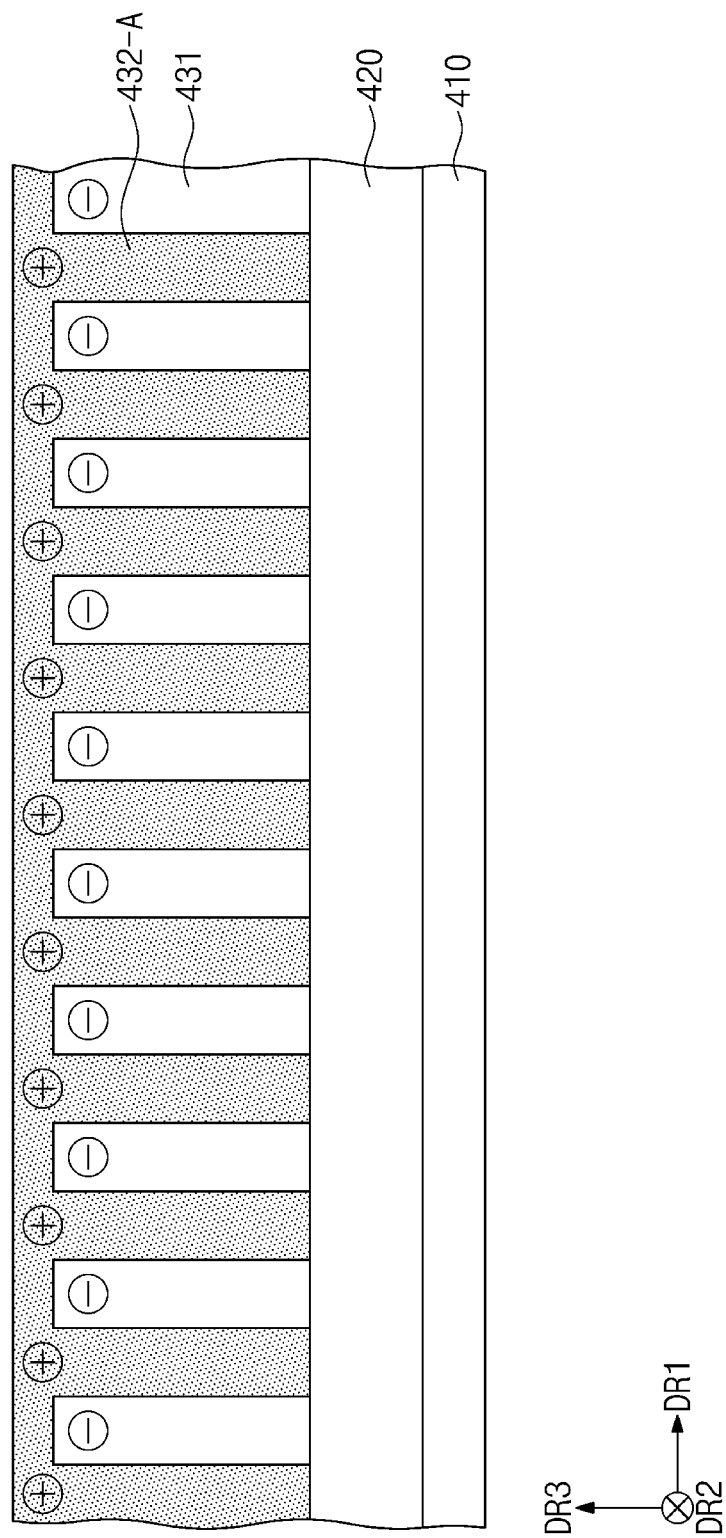
FIG. 8D is a cross-sectional view showing a method of manufacturing a detection sensor according to an embodiment of the present disclosure.
Figure 8E:
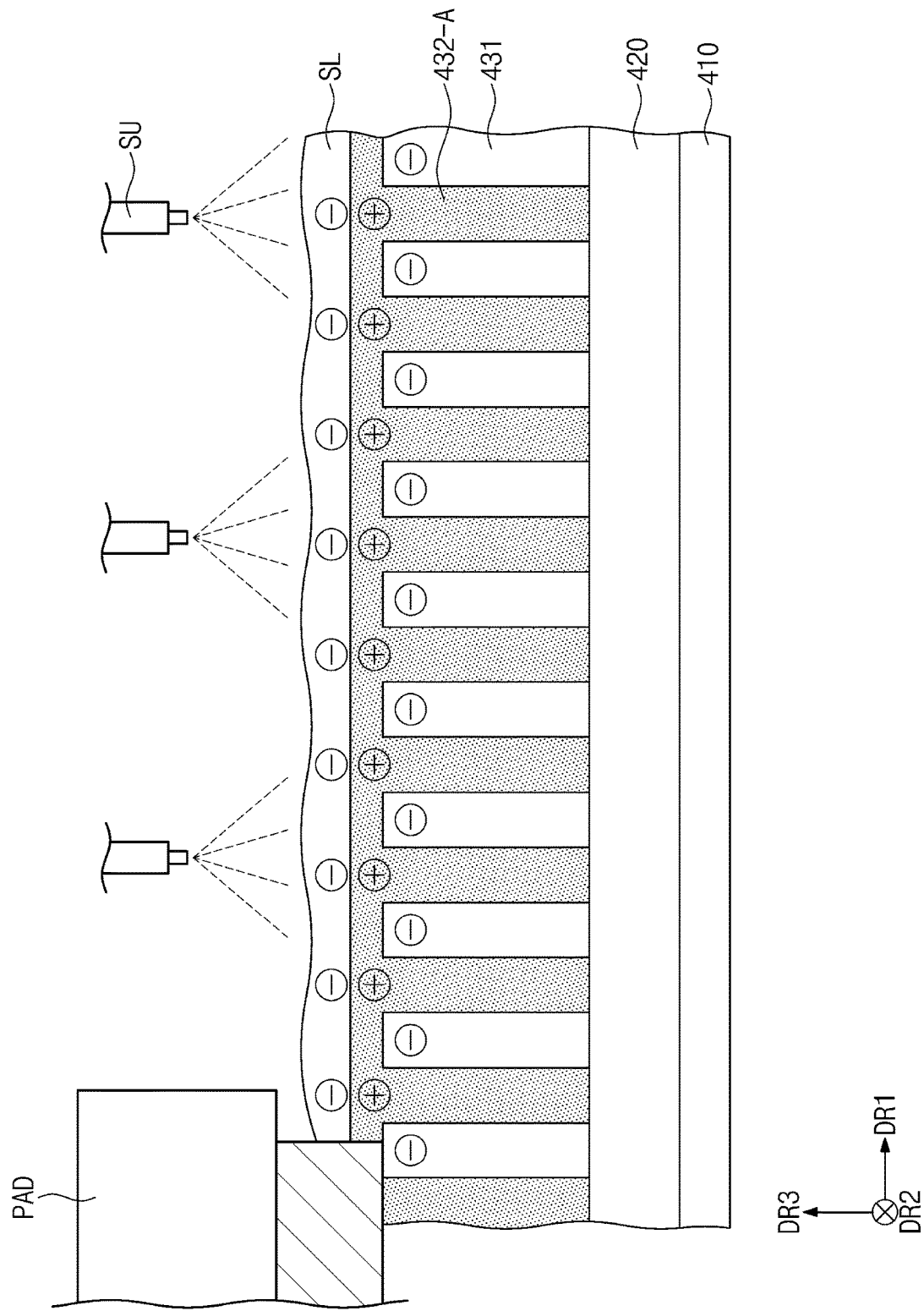
FIG. 8E is a cross-sectional view showing a method of manufacturing a detection sensor according to an embodiment of the present disclosure.
Figure 8F:
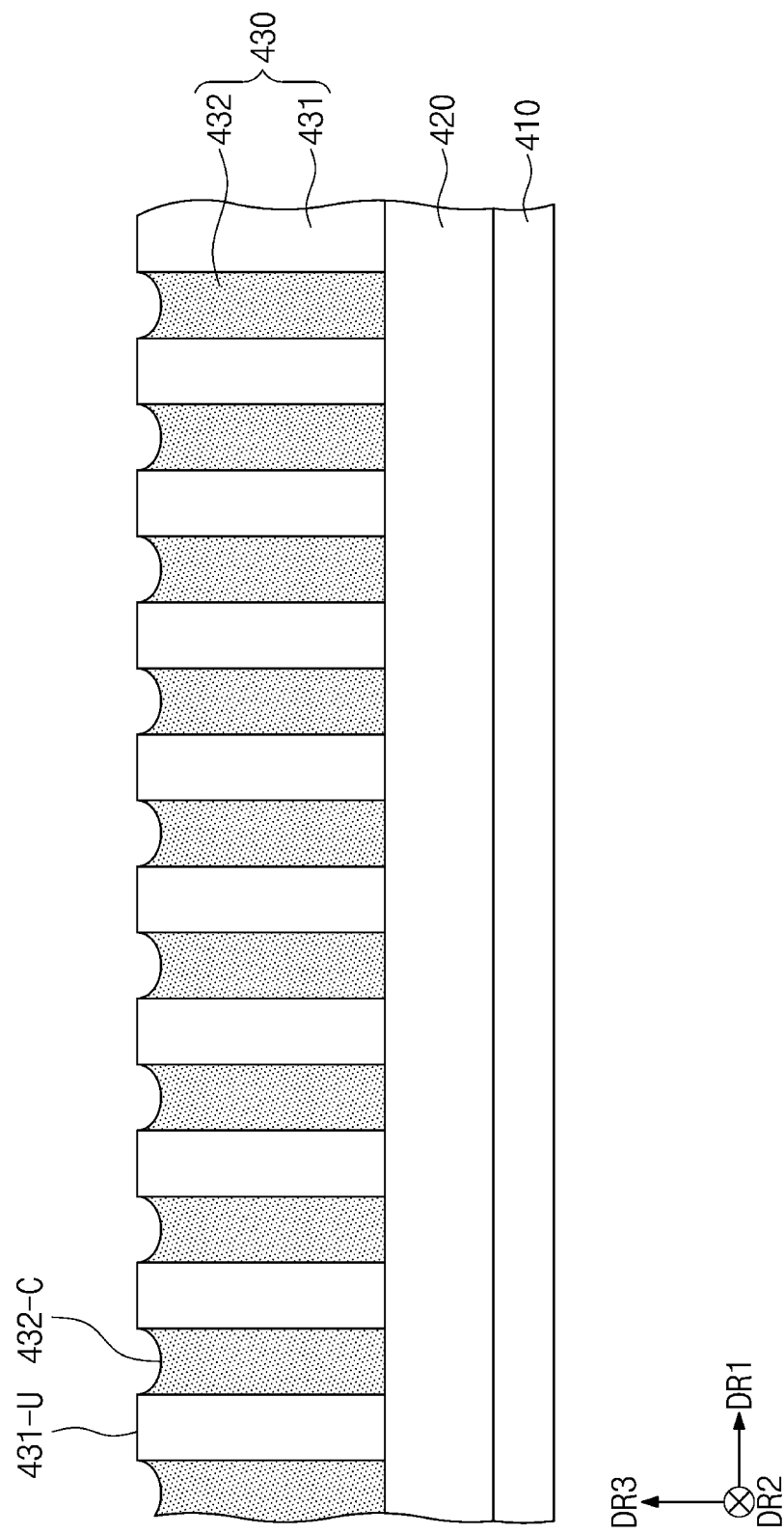
FIG. 8F is a cross-sectional view showing a method of manufacturing a detection sensor according to an embodiment of the present disclosure.
Figure 8G:
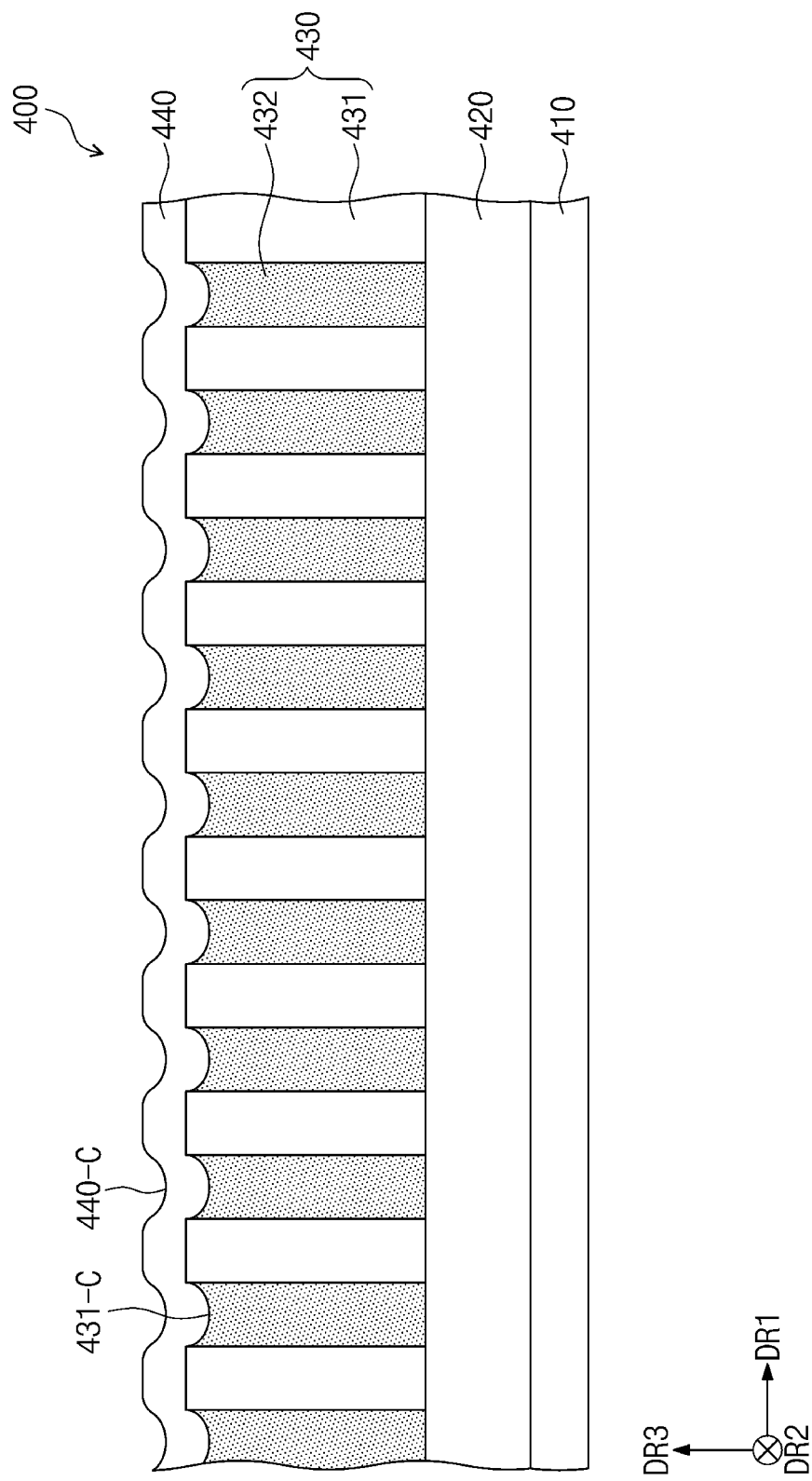
FIG. 8G is a cross-sectional view showing a method of manufacturing a detection sensor according to an embodiment of the present disclosure.

FIG. 8A is a cross-sectional view showing a method of manufacturing a detection sensor according to an embodiment of the present disclosure. FIG. 8B is a cross-sectional view showing a method of manufacturing a detection sensor according to an embodiment of the present disclosure. FIG. 8C is a cross-sectional view showing a method of manufacturing a detection sensor according to an embodiment of the present disclosure. FIG. 8D is a cross-sectional view showing a method of manufacturing a detection sensor according to an embodiment of the present disclosure. FIG. 8E is a cross-sectional view showing a method of manufacturing a detection sensor according to an embodiment of the present disclosure. FIG. 8F is a cross-sectional view showing a method of manufacturing a detection sensor according to an embodiment of the present disclosure. FIG. 8G is a cross-sectional view showing a method of manufacturing a detection sensor according to an embodiment of the present disclosure.

In FIGS. 8A to 8G, the same/similar reference numerals denote the same/similar elements in FIGS. 1 to 7, and thus, detailed descriptions of the same/similar elements will be omitted. Hereinafter, the manufacturing method of the detection sensor will be described with reference to FIGS. 8A to 8G.

Referring to FIG. 8A, the manufacturing method of the detection sensor may include forming the biometric information sensing layer including the transistor on the base layer. The base layer 410 and the biometric information sensing layer 420 may correspond to the base layer 410 and the biometric information sensing layer 420 described with reference to FIG. 7. At least one transistor 420-T (refer to FIG. 7) may be formed on the biometric information sensing layer 420.

Then, the manufacturing method of the detection sensor may include forming an initial optical pattern layer on the biometric information sensing layer. The initial optical pattern layer 430-A may be formed on the biometric information sensing layer 420 formed on the base layer 410 through successive processes. The initial optical pattern layer 430-A may include an organic material transmitting the light, however, a material for the initial optical pattern layer 430-A should not be particularly limited as long as the material has a transmissive property.

Referring to FIGS. 8B and 8C, the manufacturing method of the detection sensor may include patterning the initial optical pattern layer 430-A to form the plural transmissive portions spaced apart from each other and having a first zeta potential. The transmissive portions 431 may be formed by placing a hard mask HM including an inorganic material on the initial optical pattern layer 430-A and etching the initial optical pattern layer 430-A.

As the initial optical pattern layer 430-A is etched, an upper surface 420-U of the biometric information sensing layer 420 may be exposed. After the initial optical pattern layer 430-A is etched, the hard mask HM may be removed. A photoresist process or a nanoimprint process may be used to pattern the transmissive portions 431.

According to an embodiment, the initial optical pattern layer 430-A and the transmissive portions 431 formed by etching the initial optical pattern layer 430-A may have the first zeta potential. According to an embodiment, the first zeta potential may have a negative (−) potential. The zeta potential may be measured by a conventional method, such as an electrophoretic method, and the measuring method of the zeta potential should not be particularly limited.

Referring to FIG. 8D, the manufacturing method of the detection sensor may include forming an initial light blocking portion. The initial light blocking portion 432-A may be formed by coating an organic material that blocks the light on the base layer 410. The organic material may be coated on the base layer 410 to cover a side surface and an upper surface of the transmissive portions 431 adjacent to each other.

According to an embodiment, the initial light blocking portion 432-A may have a second zeta potential. The second zeta potential may have an electric potential opposite to the first zeta potential. For example, the second zeta potential may have a positive (+) potential.

Referring to FIGS. 8E and 8F, the manufacturing method of the detection sensor may include polishing the initial light blocking portion to form the light blocking portion 432 and spraying an abrasive. The light blocking portion 432 may be formed by polishing the initial light blocking portion 432-A. According to an embodiment, the polishing of the initial light blocking portion 432-A may be carried out by a chemical mechanical polishing (CMP) process.

In the chemical mechanical polishing (CMP) process, since the initial light blocking portion 432-A may be mechanically polished using a pad PAD while the abrasive is being sprayed substantially simultaneously by a spray unit SU, the initial light blocking portion 432-A may be chemically polished. The abrasive SL may be provided as a slurry used in the chemical mechanical polishing (CMP) process.

The abrasive SL may be sprayed onto the initial light blocking portion 432-A. The abrasive SL may be substantially simultaneously sprayed when the pad PAD is pressed to the initial light blocking portion 432-A or may be previously sprayed onto the initial light blocking portion 432-A, however, the spraying method of the abrasive SL should not be particularly limited.

According to an embodiment, the abrasive SL sprayed onto the initial light blocking portion 432-A may have a zeta potential different from that of the initial light blocking portion 432-A. As an example, the zeta potential of the abrasive SL may have the first zeta potential. According to an embodiment, the first zeta potential may have a negative (−) potential.

The abrasive SL may include about 0.005 wt % of polyacrylic acid (PAA) and about 0.005 wt % of polystyrene sulfonate (PSS). In this case, the zeta potential of the abrasive SL may be the negative (−) potential.

According to an embodiment, the abrasive SL may include about 0.005 wt % of polyacrylic acid (PAA) and about 0.007 wt % of polystyrene sulfonate (PSS). In this case, the zeta potential of the abrasive SL may be the negative (−) potential.

According to an embodiment, the abrasive SL may have an electric potential value equal to or greater than about −4 mV and equal to or smaller than about −10 Mv.

In addition, according to an embodiment, the abrasive SL may have a pH equal to or greater than about 8 and equal to or smaller than about 9.

According to the manufacturing method of the detection sensor, the transmissive portions 431 and the abrasive SL may have the first zeta potential that is the negative (−) zeta potential, and the initial light blocking portion 432-A may have the second zeta potential that is the positive (+) zeta potential and opposite to the first zeta potential during the chemical mechanical polishing (CMP) process. Accordingly, the abrasive SL may have a property of selectively adsorbing only the initial light blocking portion 432-A having the positive (+) zeta potential.

Accordingly, when the light blocking portion 432 is formed, the initial light blocking portion 432-A may be completely removed without leaving a residue of the initial light blocking portion 432-A on the upper surface 431-U of the transmissive portions 431, and the upper surface 431-U of the transmissive portions 431 may be completely exposed without being covered by the light blocking portion 432. Therefore, the manufacturing method of the detection sensor having the improved light transmittance may be provided.

Referring to FIG. 8F, the initial light blocking portion 432-A filled in between the transmissive portions 431 adjacent to each other may be recessed toward the base layer 410 due to the surface tension with respect to the transmissive portions 431 adjacent thereto, and the light blocking patterns 432-C having the concave shape may be formed.

Referring to FIG. 8G, the manufacturing method of the detection sensor may further include forming the sensing insulating layer. The sensing insulating layer 440 may be formed by coating one of the resin and the inorganic material on the optical pattern layer 430. Accordingly, the sensing insulating layer 440 may cover the transmissive portions 431 and the light blocking portion 432.

As the sensing insulating layer 440 is formed on the optical pattern layer 430, the insulating patterns 440-C that overlap the light blocking patterns 432-C and are recessed in the same direction as the direction in which the light blocking patterns 432-C are recessed to have the concave shape may be formed.

Although the embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

What is claimed is:

1. A method of manufacturing a detection sensor, comprising:
    forming a biometric information sensing layer comprising a transistor on a base layer;
    forming an initial optical pattern layer on the biometric information sensing layer;
    patterning the initial optical pattern layer to form a plurality of transmissive portions spaced apart from each other and having a first zeta potential;
    coating a light blocking material to form an initial light blocking portion that covers a side surface and an upper surface of the transmissive portions and has a second zeta potential different from the first zeta potential;
    spraying an abrasive having the first zeta potential on the initial light blocking portion; and
    polishing the initial light blocking portion such that the upper surface of the transmissive portions is exposed to form a light blocking portion, wherein the initial light blocking portion is polished by the abrasive using a pad,
    wherein the light blocking portion comprises light blocking patterns having a concave shape recessed in a direction toward the base layer between the transmissive portions.

2. The method of claim 1, wherein the first zeta potential is a negative (−) potential, and the second zeta potential is a positive (+) potential.

3. The method of claim 2, wherein the abrasive comprises about 0.005 wt % of polyacrylic acid (PAA) and about 0.005 wt % of polystyrene sulfonate (PSS).

4. The method of claim 1, further comprising forming a sensing insulating layer to cover the transmissive portions and the light blocking portion after the forming of the light blocking portion.

5. The method of claim 4, wherein the sensing insulating layer comprises insulating patterns recessed in a direction towards the light blocking portion.

6. The method of claim 1, wherein the abrasive has a pH within a range of and including about 8 to about 9.

7. A method of manufacturing a detection sensor, comprising:
    forming a biometric information sensing layer comprising a transistor on a base layer;
    forming an initial optical pattern layer on the biometric information sensing layer;
    patterning the initial optical pattern layer to form a plurality of transmissive portions spaced apart from each other and having a negative (−) zeta potential;
    coating a light blocking material to form an initial light blocking portion that covers a side surface and an upper surface of the transmissive portions and has a positive (+) zeta potential;
    spraying an abrasive having the negative (−) zeta potential on the initial light blocking portion; and
    polishing the initial light blocking portion such that the upper surface of the transmissive portions is exposed to form a light blocking portion, wherein the initial light blocking portion is polished by the abrasive using a pad,
    wherein the light blocking portion comprises light blocking patterns having a concave shape recessed in a direction toward the base layer between the transmissive portions.

8. The method of claim 7, wherein the abrasive comprises about 0.005 wt % of polyacrylic acid (PAA) and about 0.005 wt % of polystyrene sulfonate (PSS).

9. The method of claim 7, wherein the abrasive has an electric potential within a range of and including about −4 mV to about −10 Mv.

10. The method of claim 7, wherein the abrasive has a pH within a range of and including about 8 to about 9.

11. A method of manufacturing a detection sensor, comprising:
    forming a biometric information sensing layer comprising a transistor on a base layer;
    forming an initial optical pattern layer on the biometric information sensing layer;
    patterning the initial optical pattern layer to form a plurality of transmissive portions spaced apart from each other and having a first zeta potential;
    coating a light blocking material to form an initial light blocking portion that covers a side surface and an upper surface of the transmissive portions and has a second zeta potential different from the first zeta potential;
    spraying an abrasive having the first zeta potential the initial light blocking portion; and
    polishing the initial light blocking portion to form a light blocking portion, wherein the abrasive comprises about 0.005 wt % of polyacrylic acid (PAA) and about 0.005 wt % of polystyrene sulfonate (PSS) or comprises about 0.005 wt % of polyacrylic acid (PAA) and about 0.007 wt % of polystyrene sulfonate (PSS), and the initial light blocking portion is polished by the abrasive using a pad,
    wherein the light blocking portion comprises light blocking patterns having a concave shape recessed in a direction toward the base layer between the transmissive portions.

12. The method of claim 11, wherein the upper surface of the transmissive portions is exposed by the polishing of the initial light blocking portion.

* * * * *